United States Patent [19]
Jakobs et al.

[11] 3,943,408
[45] Mar. 9, 1976

[54] OVER-VOLTAGE PROTECTION CIRCUIT FOR WYE CONNECTED ELECTRIC MACHINE

[75] Inventors: Hans Jakobs, Schaumburg Township, Cook County; Charles J. Juhnke, Deerfield, both of Ill.

[73] Assignee: C. E. Niehoff & Co., Chicago, Ill.

[22] Filed: May 28, 1974

[21] Appl. No.: 474,012

[52] U.S. Cl.................. 317/13 R; 317/16; 317/31; 322/28
[51] Int. Cl.² .......................................... H02H 7/06
[58] Field of Search ........ 322/28; 317/13 R, 16, 31, 317/33 SC

[56] References Cited
UNITED STATES PATENTS

| | | |
|---|---|---|
| 3,353,090 | 11/1967 | Sawyer.............................. 322/28 X |
| 3,374,418 | 3/1968 | Henderson et al................... 322/28 |
| 3,378,753 | 4/1968 | Poppinger et al..................... 322/28 |
| 3,378,754 | 4/1968 | Rosenberry........................... 322/28 |
| 3,581,150 | 5/1971 | Kirk et al............................. 317/16 |

*Primary Examiner*—James D. Trammell
*Attorney, Agent, or Firm*—Mason, Kolehmainen, Rathburn & Wyss

[57] ABSTRACT

A load dump circuit for a wye connected electric generating machine includes a silicon controlled rectifier connected between the common terminal of the wye and one of the output terminals of the machine. A Zener diode sensing circuit is connected to the common wye terminal and to the control terminal of the controlled rectifier for rendering the controlled rectifier conductive to shunt the output windings in the event of an excessive voltage being developed thereacross as a result of a rapid load reduction or similar condition. Means are also provided to terminate field excitation during the shunting condition.

16 Claims, 1 Drawing Figure

U.S. Patent   March 9, 1976   3,943,408
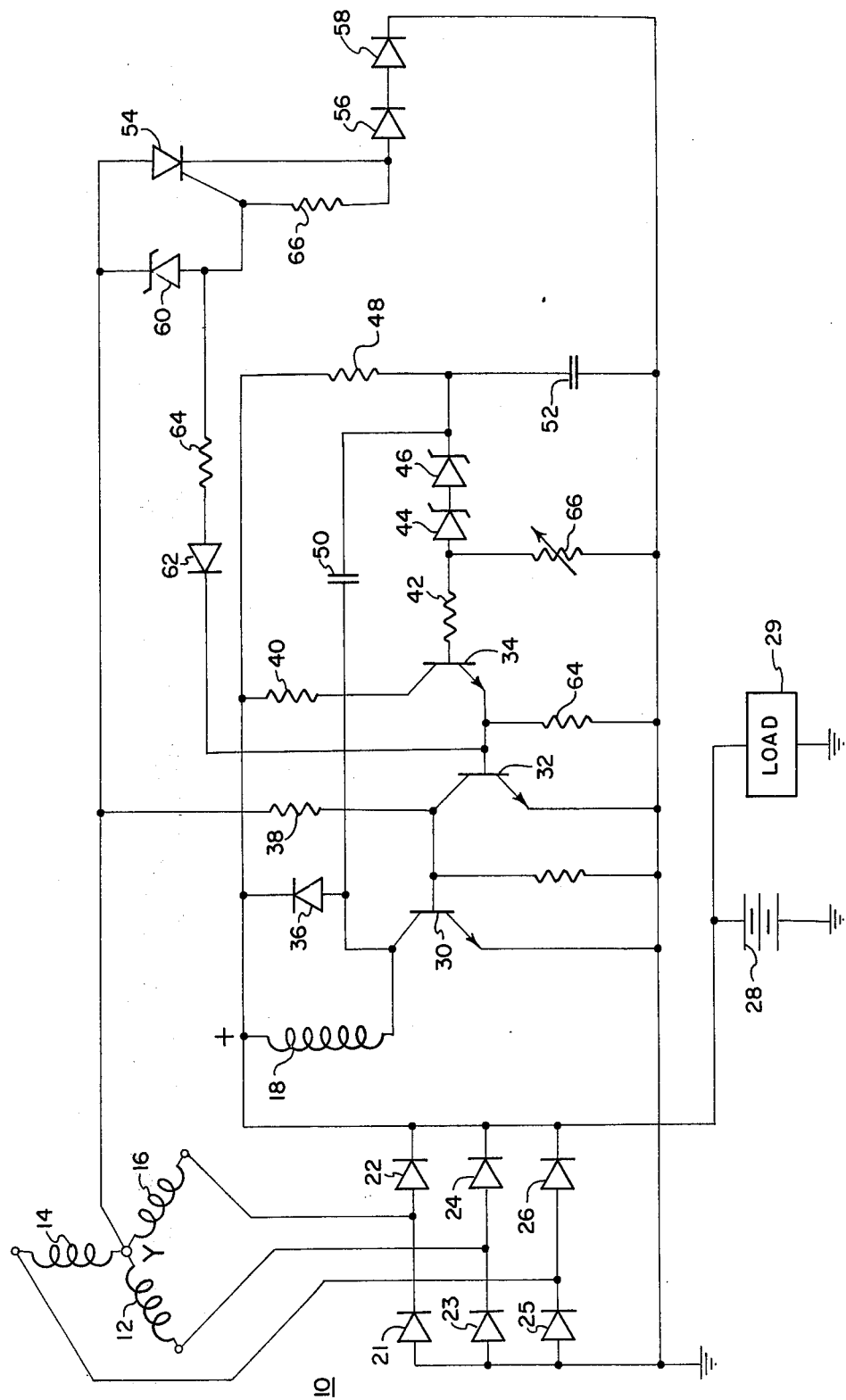

OVER-VOLTAGE PROTECTION CIRCUIT FOR WYE CONNECTED ELECTRIC MACHINE

BACKGROUND OF THE INVENTION

This invention relates generally to over-voltage protection circuits and, more particularly, to circuits for preventing excessive voltage build-up at the output of an electric machine when an electrical load is removed therefrom.

An electric generating machine such as a three phase alternator provides an output voltage that is dependent upon the field excitation provided to the machine and to the amount of current being drawn by the load connected to the machine. In general, the amount of excitation current required to provide a predetermined output voltage is proportional to the amount of current being drawn by the load. Voltage regulating circuitry may be provided to adjust the excitation current to maintain the output voltage substantially constant for various load conditions. Such voltage regulator circuits are effective to maintain the output voltage substantially constant for relatively slowly varying load conditions, however, for rapidly varying loading conditions, output voltage transients cannot be prevented by controlling the excitation current. For example, when the battery of an automobile has been disconnected from an automotive alternator, resulting in a loss in the filtering provided thereby, and subsequently a large power consuming accessory such as an air conditioner is turned off, large voltage transients can occur at the output of the alternator due to the magnetic energy stored in the field even though the voltage regulator has terminated the field excitation.

Several techniques for eliminating the voltage transients resulting from a rapid change in the electrical load on a generating machine are known. Such techniques generally employ circuitry for sensing the output voltage of the machine and for shunting or otherwise isolating the output windings of the machine when an over-voltage condition is sensed. Representative systems are described in U.S. Pat. Nos. 3,488,560, issued Jan. 6, 1970, to R. L. Konopa, and 3,581,150, issued May 25, 1971, to T. E. Kirk et al.

Whereas these techniques provide a way to effectively suppress an over-voltage transient, in a polyphase machine having several windings, the prior art techniques require a separate switching circuit for each phase winding of the machine. The separate switching circuits result in relatively complex circuitry which is expensive and prone to failure as a result of the complexity thereof.

Accordingly, it is an object of the present invention to provide a simplified over-voltage protection circuit for a wye connected electric generating machine.

It is another object of the present invention to provide a shunt type over-voltage protection system for a multiple phase generating machine that requires only a single power switching element.

In accordance with a preferred embodiment of the invention, the phases of the power generating machine are connected together in a wye configuration, and rectifier means are provided for connecting the windings to a pair of output terminals of the machine. An electronic switching circuit comprising a silicon controlled rectifier is connected to the common wye terminal of the machine and to one of the output terminals, generally the ground or common terminal. A voltage sensing circuit including a Zener or avalanche diode is connected between the common wye terminal and a control terminal of the silicon controlled rectifier to render the silicon controlled rectifier conductive to shunt the wye terminal to the output terminal when the voltage at the wye terminal exceeds a predetermined level. The voltage sensing Zener diode is also connected to field energizing circuitry for removing the excitation current from the field during the over-voltage condition.

The invention together with the above and other objects and advantages may be best understood from the following detailed description of the embodiments of the invention shown in the accompanying drawing, where:

The single FIGURE is a schematic diagram showing the over-voltage protection circuit according to the invention used in conjunction with a three-phase alternator.

DETAILED DESCRIPTION OF THE INVENTION

Referring to the FIGURE, there is shown an electric power generating alternator system usable in a vehicular electrical system. An alternator generally denoted by the numeral 10 includes a field coil 18, serving as an excitation winding, and three output windings 12, 14 and 16 connected together in a wye configuration. Although the alternator 10 shown in the FIGURE is a three-phase machine having three output windings, it should be noted that any wye connected machine having any number of phases such as, for example, six phases, may be used and still fall within the scope of the invention. Six diodes 21–26 are connected together and to the wye connected windings 12, 14 and 16 to form a three phase full wave rectifier circuit for the alternator 10. The output terminals of the rectifier circuit are connected to a source of common potential, such as ground, and to a load 29 and a battery 28.

The field or excitation winding 18 is connected to the output of the rectifier circuit and to a voltage regulating excitation circuit or energizing means comprising the transistors 30, 32 and 34 and associated circuitry. The transistor 30 of the voltage regulating excitation circuit has a collector connected to the field coil 18 and an emitter connected to ground. A diode 36 is connected across the field coil 18, and the base of the transistor 30 is connected to the collector of the transistor 32 and to the common wye junction of the windings 12, 14 and 16 by means of a resistor 38. The base of the transistor 32 is connected to the emitter of the transistor 34, the transistor 34 having a collector connected to the positive output terminal of the alternator 10 via a resistor 40. The base of the transistor 34 is connected to the positive output terminal of the alternator 10 by means of resistors 42, 48 and a pair of Zener or avalanche diodes 44, 46. A positive feedback capacitor 50 is connected between the collector of the transistor 30 and the anode of the Zener diode 46 to provide more positive switching of the transistor 30. A filter capacitor is connected between the cathode of the Zener diode 46 and ground.

The electronic over-voltage suppressing circuit of the embodiment shown in the FIGURE comprises a silicon controlled rectifier 54 having an anode connected to the common wye terminal of the alternator 10 and a cathode terminal connected to ground potential by means of a pair of diodes 56 and 58. The rectifier 54 and the diodes 56, 58 form a switch means for shunting excessive energy to ground. Although a silicon controlled rectifier is shown in the present embodiment, another thyristor, such as a triac or similar electronic switch may also be used. A Zener diode 60 is connected between the anode and control terminals of the silicon controlled rectifier 54 and to the base of the transistor 32 by means of a diode 62 and a resistor 64. A biasing resistor 66 is connected between the control and cathode terminals of the silicon controlled rectifier 54.

In operation, regulation of the alternator output voltage is provided by the transistors 30, 32 and 34. When the output voltage of the alternator is below a predetermined regulating voltage, current is applied to the base of the transistor 30 from the wye junction by means of the resistor 38, thereby rendering the transistor 30 conductive to complete the current path through the field winding 18 to provide excitation current to the field. Under the aforementioned conditions, the transistors 32 and 34 are maintained in a nonconductive state because the output voltage is below the avalanche voltage of the Zener diodes 44 and 46. When the output voltage of the alternator exceeds a predetermined level, such as, for example, 12 or 24 volts, the output voltage causes the Zener diodes 44 and 46 to be driven into a conductive avalanche condition thereby rendering the transistors 32 and 34 conductive. When the transistor 32 is rendered conductive, the current flowing through the resistor 38 is shunted to ground, thereby causing the transistor 30 to be rendered nonconductive and removing the excitation current from the field coil 18.

The voltage regulating circuitry described above provides voltage regulation for the output voltage of the alternator 10 for normally occurring changes in the load, such as, those caused by the normal charging of the battery 28, and by the switching of other loads such as lights and motors, etc. If an abnormal situation occurs wherein a large portion of a load is suddenly removed from the alternator output and no battery filtering effect is present, as in the case of an accidental disconnecting of the battery 28 followed by a disconnecting of the load 29, the magnetic energy stored in the field coil 18 will continue to excite the alternator 10 even after the transistor 30 has been rendered nonconductive. In such an event, the output voltage surge of the alternator could exceed 200 to 300 volts in spite of the regulating action of the voltage regulator, thereby damaging the regulator circuit and other equipment connected to the alternator. The over-voltage protection circuit according to the invention is designed to prevent the over-voltage surges caused by such abnormal conditions.

The silicon controlled rectifier 54 of the protection circuit is connected between the common wye terminal of the alternator 10 and ground potential by means of the diodes 56 and 58. In the event of a decrease in the load too rapid to be compensated by the regulating circuit, the voltage at the common wye junction of the alternator 10 reaches an amplitude sufficient to cause breakdown or avalanche of the Zener diode 60. The breakdown of the Zener diode 60 renders the diode 60 conductive to forward bias the gate of the silicon controlled rectifier 54. In an alternate embodiment, the Zener diode 60 or other voltage sensing means could be connected to one of the output terminals or any other convenient point on the alternator that provides an indication of excessive voltage at the alternator output. Forward biasing the gate of the silicon controlled rectifier 54 causes the rectifier 54 to be rendered conductive to shunt the common wye terminal to the ground potential source, thereby causing the output voltage at the common wye terminal to be reduced to within four diode junction drops of ground potential, thereby limiting the output voltage of the alternator.

Due to the rectifying action of the diodes 21-26, the current flowing through the silicon controlled rectifier 54 is a uni-directional current. As a result, the controlled rectifier 54 is maintained conductive until the speed of the alternator is reduced or until the magnetic energy stored in the field winding 18 drops to a sufficiently low value to reduce the current flowing through the controlled rectifier 54 to a value below the holding current of the rectifier. The aforementioned rectifier action assures that in machines capable of generating current in the absence of excitation, the controlled rectifier 54 remains conductive until the output voltage of the alternator is reduced sufficiently to drop the output current to a value below the holding current of the controlled rectifier. To reduce the output current below the holding current of the controlled rectifier, it may be necessary to reduce the alternator speed. This feature is particularly important for machines wherein the residual magnetism may provide an excessively high output voltage at high rpm under no load conditions even though no field excitation is applied by the regulator circuit.

When the silicon controlled rectifier 54 is rendered conductive, the output voltage of the alternator 10 drops substantially to ground potential. The output voltage is sensed by the transistor 34 and tends to render the transistor 30 conductive to energize the field 18. In order to prevent the undesirable excitation of the field 18 when the controlled rectifier 54 is rendered conductive following an over-voltage condition, the base of the transistor 32 is connected to the anode of the Zener diode 60 by means of a diode 62 and a resistor 64. The connection to the base of the transistor 32 causes a forward biasing potential to be applied to the transistor 32 upon breakdown of the Zener diode 60 to render the transistor 32 conductive whenever an over-voltage condition sufficient to avalanche the Zener diode 60 exists. The diodes 56 and 58 are employed to bias the cathode of the controlled rectifier 54 above ground to assure that the forward biasing potential at the gate of the controlled rectifier 54 is sufficient to forward bias the base of the transistor 32. Current flowing through the diodes 56, 58 when the rectifier 54 is conductive results in a bias voltage capable of maintaining the transistor 32 conductive as long as the rectifier 54 is maintained conductive.

Although the present invention has been described with reference to the details of the illustrated embodiment, it should be understood that other modifications and embodiments will be apparent to those skilled in the art. The details of the illustrated embodiment are not intended to limit the scope of the present invention as set forth in the following claims.

What is claimed is:

1. An electric power generating system comprising:
    a plurality of output windings connected together in wye configuration at a common junction;
    first and second power output terminals;
    means connecting said output windings to said output terminals;

voltage sensing means responsive to a voltage indicative of an excessive voltage condition between said power output terminals; and switch means having first and second main terminals and a control terminal, said first main terminal being connected to said common junction, said second main terminal being connected to one of said power output terminals, and said control terminal being coupled to said voltage sensing means, said switch means being responsive to said voltage sensing means for electrically connecting said common junction to said one output terminal when the voltage between said power output terminals exceeds a predetermined amplitude.

2. A power generating system as recited in claim 1 further including an excitation winding and energizing means connected to said excitation winding for applying excitation current thereto, said energizing means being responsive to said excessive voltage condition for preventing the application of excitation current to said excitation winding when said common junction is electrically connected to said one power output terminal.

3. A power generating system as recited in claim 2 wherein said switch means includes a thyristor having main electrodes coupled to said common junction and said one of said output treminals and a control electrode coupled to said voltage sensing means.

4. A power generating system as recited in claim 3 wherein said voltage sensing means includes a breakdown diode coupled to said common junction and said control electrode.

5. A power generating system as recited in claim 4 wherein said thyristor is a controlled rectifier.

6. A power generating system as recited in claim 2 wherein said energizing means is further connected to said output terminals for sensing the output voltage thereat, said energizing means being responsive to said output voltage for applying said excitation current to said excitation winding when said output voltage drops below a second predetermined amplitude.

7. A power generating system as recited in claim 6 wherein said connecting means includes a plurality of rectifier diodes.

8. An electronic load dump circuit for an electric generating machine having an excitation winding, a pair of output terminals and a plurality of output windings connected together at a common junction in a wye configuration and coupled to said output terminals, said system comprising:

avalanche means having a conductive and a non-conductive state electrically coupled to one of said output windings, said avalanche means being responsive to the voltage at said one output winding and operable to said conductive state when the voltage exceeds a predetermined amplitude;

electronic switch means having main terminals connected to said common junction and to one of said output terminals, and a control terminal; and means connecting said control terminal to said avalanche means, said electronic switch means being responsive to said conductive state for providing a low impedance path between common junction and said one of said output terminals for effectively short circuiting said common junction to said one output terminal.

9. A load dump circuit as recited in claim 8 further including voltage regulating means connected to said excitation winding for providing excitation current thereto, said voltage regulating means being responsive to voltage provided by said electric generating means for preventing the application of excitation current to said excitation windings when the voltage between said output terminals exceeds a predetermined amplitude.

10. A load dump circuit as recited in claim 9 wherein said voltage regulating means including means for preventing the application of excitation current to said excitation windings when an electrically conductive path is provided by said electronic switch means between said common junction and said one of said output terminals.

11. A load dump circuit as recited in claim 10 wherein said electronic switch means includes a controlled rectifier.

12. A load dump circuit as recited in claim 11 wherein said electronic switch means includes a diode connected in series with said controlled rectifier.

13. A load dump circuit as recited in claim 11 wherein said avalanche means includes a Zener diode.

14. In an electrical power system having a pair of output terminals and employing a plurality of output windings, said windings being connected together in a wye configuration at a common junction, an over-voltage protection system comprising:

voltage sensing means electrically coupled to one of said output windings for sensing the voltage thereat; and switch means coupled between said common junction and one of said output terminals, said switch means being further coupled to said voltage sensing means and responsive thereto for electrically connecting said common junction to said one of said output terminals when the voltage at one of said windings exceeds a predetermined amplitude.

15. A power system as recited in claim 14 wherein said switch means includes a controlled rectifier having main electrodes connected in a series circuit between said common junction and said one output terminal, and a control electrode coupled to said voltage sensing means.

16. A power system as recited in claim 15 wherein said voltage sensing means includes breakdown means connected in a series circuit between said common junction and said control electrode.

* * * * *